United States Patent
Zhang et al.

(10) Patent No.: US 11,525,384 B2
(45) Date of Patent: Dec. 13, 2022

(54) HIGH TEMPERATURE RESISTANT LOW FRICTION WASHER AND ASSEMBLY

(71) Applicants: Wensheng Zhang, Rochester Hills, MI (US); Rohit Paranjpe, Rochester Hills, MI (US); Yi-Hsin Chen, Rochester Hills, MI (US); Kanwerdip Singh, Oakland Township, MI (US)

(72) Inventors: Wensheng Zhang, Rochester Hills, MI (US); Rohit Paranjpe, Rochester Hills, MI (US); Yi-Hsin Chen, Rochester Hills, MI (US); Kanwerdip Singh, Oakland Township, MI (US)

(73) Assignee: FCA US LLC, Auburn Hills, MI (US)

(*) Notice: Subject to any disclaimer, the term of this patent is extended or adjusted under 35 U.S.C. 154(b) by 506 days.

(21) Appl. No.: 16/780,359

(22) Filed: Feb. 3, 2020

(65) Prior Publication Data
US 2021/0239027 A1    Aug. 5, 2021

(51) Int. Cl.
*F16B 5/02* (2006.01)
*F01N 13/18* (2010.01)
*F16B 43/00* (2006.01)
*F16B 39/24* (2006.01)
*F16B 1/00* (2006.01)

(52) U.S. Cl.
CPC ........ *F01N 13/1811* (2013.01); *F16B 5/0241* (2013.01); *F16B 39/24* (2013.01); *F16B 43/002* (2013.01); *F16B 5/02* (2013.01); *F16B 2001/0021* (2013.01)

(58) Field of Classification Search
CPC .......... F16B 5/02; F16B 5/0241; F16B 39/10; F16B 39/24; F16B 43/00; F16B 43/002; F16B 2001/0021; F01N 13/1811

USPC .............. 411/132, 136, 337, 371.2, 531, 534
See application file for complete search history.

(56) References Cited

U.S. PATENT DOCUMENTS

| | | | |
|---|---|---|---|
| 5,785,115 A | 7/1998 | Laveran | |
| 6,966,735 B1* | 11/2005 | Yamazaki | F16B 43/009 411/536 |
| 7,168,902 B2* | 1/2007 | Terry | F16B 39/24 411/149 |
| 8,152,377 B2 | 4/2012 | Konishi et al. | |
| 8,206,035 B2 | 6/2012 | Martin et al. | |
| 8,454,290 B2* | 6/2013 | Schaser | F16B 5/0258 411/902 |
| 2004/0031624 A1 | 2/2004 | Scott et al. | |
| 2007/0196195 A1* | 8/2007 | Lin | F16B 39/24 411/161 |
| 2007/0196632 A1* | 8/2007 | Meyer, Jr. | B05D 1/36 427/430.1 |

(Continued)

FOREIGN PATENT DOCUMENTS

JP      2005282668 A    10/2005

*Primary Examiner* — Roberta S Delisle
(74) *Attorney, Agent, or Firm* — Ralph E. Smith

(57) ABSTRACT

A bolted joint for coupling two components that undergo thermal expansion and contraction includes a bolt having a head and a stem, the bolt configured to provide a clamping force between the two components. A first washer having a thermal resistant, low friction coating is configured to be disposed between one of the two components and the bolt head to enable the one component to slide relative to the bolt during the thermal expansion and contraction, while maintaining the clamping force, to facilitate preventing bending or shearing of the bolt.

16 Claims, 2 Drawing Sheets

(56) References Cited

U.S. PATENT DOCUMENTS

| | | | |
|---|---|---|---|
| 2008/0014046 A1* | 1/2008 | Bauer | F16B 43/00 411/164 |
| 2008/0159671 A1* | 7/2008 | Leonardelli | B05D 5/08 508/108 |
| 2011/0064539 A1* | 3/2011 | Ghatikar | E04F 13/0837 411/371.2 |
| 2013/0243544 A1* | 9/2013 | Delcher | F16B 39/282 411/154 |
| 2015/0028142 A1* | 1/2015 | Coray | B02C 17/22 241/300 |
| 2015/0260214 A1* | 9/2015 | Mistral | F16B 31/028 411/531 |
| 2016/0003287 A1* | 1/2016 | Andersson | F16B 39/282 411/533 |

* cited by examiner

HIGH TEMPERATURE RESISTANT LOW FRICTION WASHER AND ASSEMBLY

FIELD

The present application relates generally to washers and, more particularly, to washers having a high temperature resistant, low friction coating to improve mechanical fatigue life.

BACKGROUND

Typical vehicles include bolted joints to couple two or more components together. Some bolted joints repeatedly experience elevated temperatures such as, for example, joints utilized to couple an exhaust manifold to a cylinder head. Structural durability of the bolted joint typically depends on, among other things, mechanical/assembly loads and thermal loads. The mechanical and assembly loads are often fixed, but the thermal loads are inherently transient (e.g., cyclic) in nature. Such cyclic thermal loads can have a significant impact on thermo-mechanical fatigue life of the bolted joint. As such, due to mechanical constraints that may be created by friction force from the bolted joints, the exhaust manifold may not expand and contract feely, thereby potentially causing damage to the exhaust manifold or deformation to the bolt in responding to the thermal expansion. Thus, while such conventional systems do work well for their intended purpose, there remains a desire for improvement in the relevant art.

SUMMARY

According to one example aspect of the invention, a bolted joint for coupling two components that undergo thermal expansion and contraction is provided. In one example configuration, the bolted joint includes a bolt having a head and a stem, the bolt configured to provide a clamping force between the two components. A first washer having a thermal resistant, low friction coating is configured to be disposed between one of the two components and the bolt head to enable the one component to slide relative to the bolt during the thermal expansion and contraction, while maintaining the clamping force, to facilitate preventing bending or shearing of the bolt.

In addition to the foregoing, the described bolted joint may include one or more of the following features: a second washer disposed between the first washer and the bolt head, the second washer having the thermal resistant, low friction coating to enable the first and second washers to slide relative to each other during the thermal expansion and contraction, while maintaining the clamping force, to further facilitate preventing bending or shearing of the bolt; a thread lock patch configured to secure the bolt stem to the other of the two components; wherein the thermal resistant, low friction coating is a multi-layer coating; wherein the thermal resistant, low friction coating has a coefficient of friction of less than 0.6; and wherein the thermal resistant, low friction coating is resistant to temperatures up to approximately 600° C.

In addition to the foregoing, the described bolted joint may include one or more of the following features: wherein the thermal resistant, low friction coating is a diamond-like carbon tungsten material; wherein the multi-layer coating comprises a first layer of material, a second layer of material, a third layer of material, and a fourth layer of material; wherein the first layer of material is chromium, the second layer of material is chromium-nickel, the third layer of material is a primer, and the fourth layer of material is a-C:H:WC; and wherein the first and second washers are annular and each have a first side and an opposite second side, wherein the thermal resistant, low friction coating is disposed on each of the first and second sides of each of the first and second washers.

According to another example aspect of the invention, an assembly configured to undergo thermal expansion and contraction is provided. In one example configuration, the assembly includes a first component defining a first bore, a second component defining a second bore, and a bolted joint coupling the first and second components. The bolted joint includes a bolt having a head and a stem, the bolt extending into the first and second bores to provide a clamping force between the first and second components. A first washer having a thermal resistant, low friction coating is disposed between the first component and the bolt head to enable the first component to slide relative to the bolt during the thermal expansion and contraction, while maintaining the clamping force, to facilitate preventing bending or shearing of the bolt.

In addition to the foregoing, the described assembly may include one or more of the following features: wherein the first bore is sized to provide a clearance between the bolt stem and the first component to allow for the thermal expansion and contraction of the first component without contacting the bolt stem; wherein the second bore threadingly receives the bolt stem, and a thread lock patch is provided to secure the bolt stem to the second component; wherein the first component is an exhaust manifold and the second component is a cylinder head, wherein the bolted joint includes a first bolted joint at a first end of the exhaust manifold, and a second bolted joint at an opposite second end of the exhaust manifold, and bolts without washers having the thermal resistant, low friction coating are coupled to the exhaust manifold between the first and second ends of the exhaust manifold; and a second washer disposed between the first washer and the bolt head, the second washer having the thermal resistant, low friction coating to enable the first and second washers to slide relative to each other during the thermal expansion and contraction, while maintaining the clamping force, to further facilitate preventing bending or shearing of the bolt.

In addition to the foregoing, the described assembly may include one or more of the following features: wherein the thermal resistant, low friction coating is a multi-layer coating; wherein the thermal resistant, low friction coating has a coefficient of friction of less than 0.6 and is resistant to temperatures up to approximately 600° C.; wherein the thermal resistant, low friction coating is a diamond-like carbon tungsten material; and wherein the multi-layer coating comprises a first layer of material, a second layer of material, a third layer of material, and a fourth layer of material, and wherein the first layer of material is chromium, the second layer of material is chromium-nickel, the third layer of material is a primer, and the fourth layer of material is a-C:H:WC.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

The present application is directed to a bolted joint having washers with a high temperature resistant, low friction coating for the assembly of two dissimilar components subjected to elevated temperatures. The coated washers are configured to control friction between the bolt and component to thereby significantly reduce or prevent bolt bending motion. As such, the coated washers provide increased thermo-mechanical fatigue life not only the bolt, but also the coupled components. Additionally, the coated washers prevent a bolt from loosening after the friction force is reduced.

Figure 1:
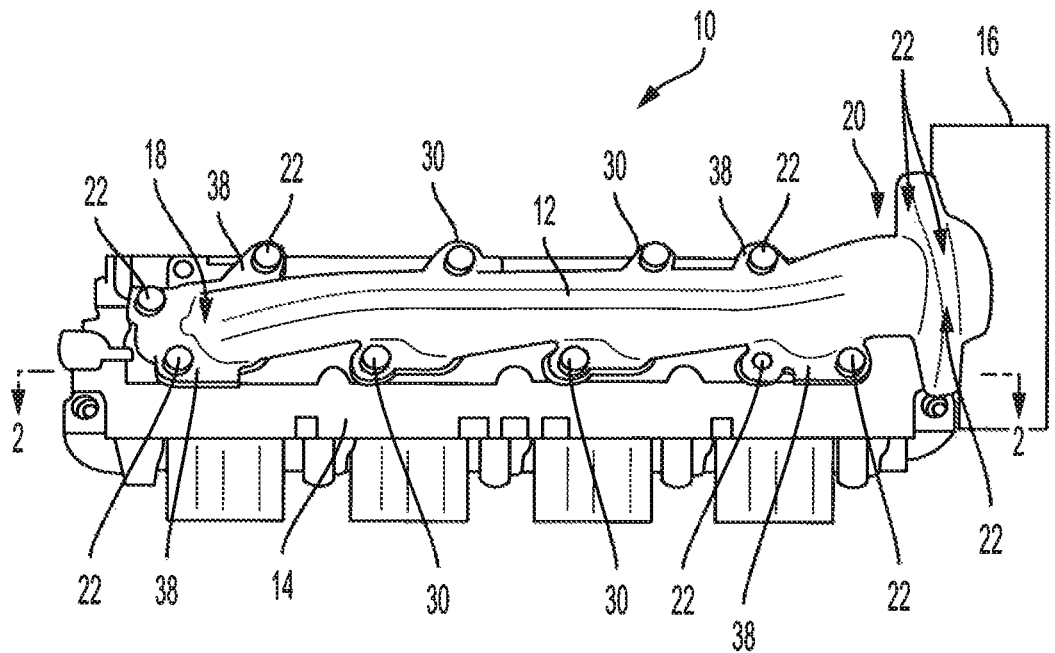
FIG. 1 is a side view of an example bolted joint coupling a vehicle exhaust manifold, cylinder head, and catalytic converter, in accordance with the principles of the present disclosure.
Figure 2:
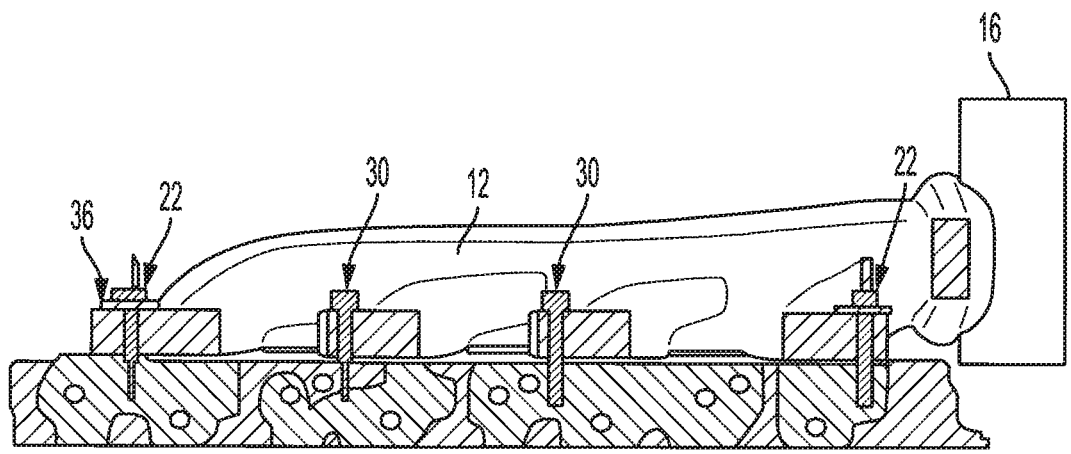
FIG. 2 is a sectional view of the exhaust manifold shown in FIG. 1 and taken along line A-A, in accordance with the principles of the present disclosure.

Referring now to the drawings, FIGS. 1 and 2 illustrate a vehicle 10 generally having an exhaust manifold 12 coupled between an engine cylinder head 14 and a catalytic converter 16. An oxygen sensor 18 is mounted on the exhaust manifold 12, which includes an EGR port 20 configured to supply exhaust gases for emission control. As described herein in more detail, bolted joints 22 are configured to couple the exhaust manifold 12 to the cylinder head 14 to seal exhaust gases within the exhaust manifold 12 and the cylinder head 14. Similarly, bolted joints 22 couple the exhaust manifold 12 to the catalytic converter 16 to seal the exhaust gases within the exhaust manifold 12 and the catalytic converter 16. However, it will be appreciated that the bolted joint 22 described herein is not limited to an exhaust manifold and may be utilized to couple various other components together. For example, bolted joints 22 may be utilized to couple a turbocharger and EGR system.

With additional reference to FIG. 3, the bolted joint 22 will be described in more detail. As discussed above, in typical systems, a certain clamping force is required in order to couple and seal the exhaust manifold to the cylinder head. However, due to these mechanical constraints created by friction force from conventional bolts, the exhaust manifold may not be able to expand and contract freely. Accordingly, as the exhaust manifold expands and contracts, the bolt can be moved with the exhaust manifold, which can lead to damage to the manifold and/or bolts. As such, bolted joint 22 is configured to reduce the friction force between the exhaust manifold 12 and the cylinder head 14 and allow movement of the exhaust manifold 12 under the clamping load, thereby leading to increased fatigue life of both the exhaust manifold 12 and the bolted joint 22, as described herein in more detail.

Figure 3:
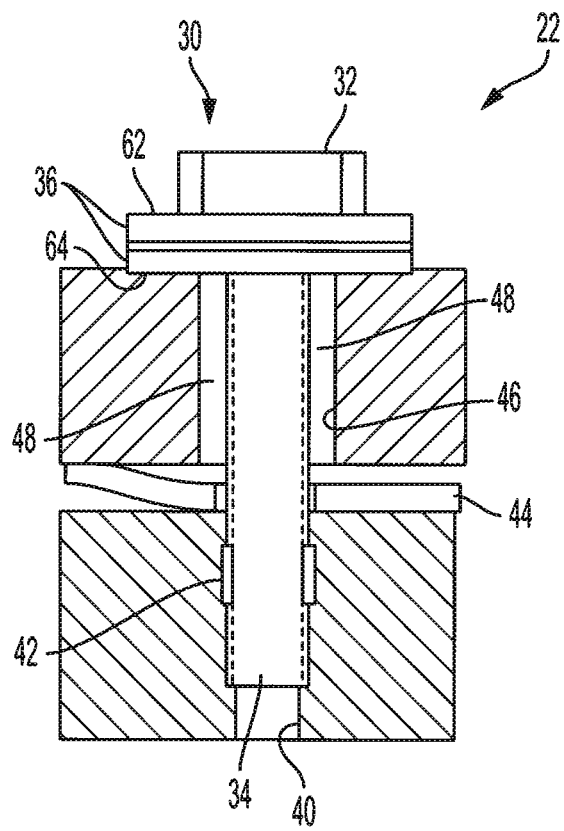
FIG. 3 is a cross-sectional view of the example bolted joint shown in FIG. 1, in accordance with the principles of the present disclosure.

As shown in FIG. 3, in the example embodiment, the bolted joint 22 is configured to couple two components such as, for example, the illustrated exhaust manifold 12 and cylinder head 14. The bolted joint 22 generally includes a bolt 30 having a head 32 and a stem 34. One or more high temperature resistant, low friction washers 36 are disposed around the stem 34 between the bolt head 32 and an outer surface or flange 38 of the exhaust manifold 12. In this way, the washers 36 are not fixed to exhaust manifold 12 or bolt 30 and allow relative sliding between the washer 36, exhaust manifold 12, and bolt 30 to facilitate preventing deformation of the bolt 30 during thermal expansion/contraction. Although two high temperature resistant, low friction washers 36 are illustrated, bolted joint 22 may have any suitable number of washers that enables bolted joint 22 to function as described herein. For example, bolted joint 22 may have one or three high temperature resistant, low friction washers 36.

In the illustrated embodiment, a threaded bore 40 is formed in the cylinder head 14 and configured to receive an end of the bolt stem 34. One or more patches of thread lock 42 are provided between the threaded bore 40 and the bolt stem 34 to further secure the bolt 30 to the cylinder head 14. A gasket 44 is disposed between the exhaust manifold 12 and the cylinder head 14 and is configured to provide sealing therebetween. A wide bore 46 is formed in the exhaust manifold flange 38 to define a clearance 48 around the bolt stem 34 to facilitate movement of the exhaust manifold 12 (i.e., from expansion and contraction) without contacting and causing a bending moment on the bolt 30.

Figure 4:
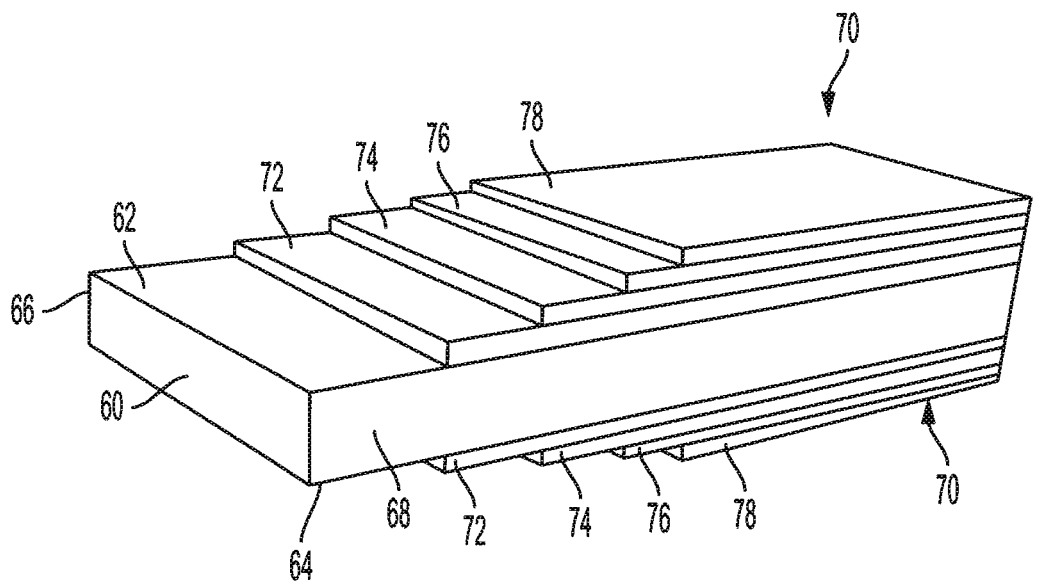
FIG. 4 is a sectional view of an example high temperature resistant, low friction washer that may be utilized with the bolted joint shown in FIG. 3, in accordance with the principles of the present disclosure.

With additional reference to FIG. 4, in the example embodiment, the high temperature resistant, low friction washers 36 each include an annular or substantially annular body 60 having an upper surface 62, an opposite lower surface 64, an outer diameter 66, and an inner diameter 68 defining an aperture to receive the bolt stem 34 therethrough. In the example embodiment, the high temperature resistant, low friction washers 36 include a high temperature resistant, low friction multi-layer coating 70 comprising a first layer 72, a second layer 74, a third layer 76, and an outer fourth layer 78. In the illustrated example, the high temperature resistant, low friction coating 70 is disposed on both the upper and lower surfaces 62, 64 and not on the outer and inner diameters 66, 68. It will be appreciated however, that high temperature resistant, low friction coating 70 may be disposed on any combination of surfaces 62, 64, 66, 68 including only a single surface.

In the example embodiment, the annular body 60 is fabricated from a rigid base material such as a metal (e.g., stainless steel), and the multi-layer coating 70 is a diamond-like carbon Tungsten (DLC-W) material. In the illustrated example, the multi-layer coating 70 includes the first layer 72 being of Chromium, the second layer 74 being of Chromium-Nickel, the third layer 76 being a primer, and the fourth layer 78 being the DLC layer.

In one example, the "low friction" coating 70 includes a coefficient of friction p less than 0.6 or approximately 0.6. In one example, the "high temperature" resistant coating 70 is resistant to temperatures up to 300° C. or approximately 300° C. In another example, the "high temperature" resistant coating 70 is resistant (e.g., wear resistant, provides frictional coefficient at that temperature, etc.) to temperatures up to 600° C. or approximately 600° C. While coating 70 is described as a DLC-W coating, it will be appreciated that washer 36 may have any suitable material coating that enables bolted joint 22 to function as described herein.

In the example implementation, the multi-layer coating 70 provides a low friction surface which can be disposed against the exhaust manifold 12, bolt head 32, and/or the multi-layer coating 70 of another washer 36. In this way, during thermal expansion and contraction, the high temperature resistant, low friction coatings 70 enable the washers 36 to slide relative to each other and/or the component to allow the movement without stressing, bending, or shearing the bolt 30, thereby providing increased fatigue life for both the exhaust manifold 12 and the bolt 30. Additionally, the bolted joint enables exhaust manifold 12 to withstand vibration due to engine dynamics and road load without loosening.

Accordingly, for the bolted joint 22, since the friction force is the product of the friction coefficient and a normal force required to meet the clamping and sealing requirements of the components, lowering the friction coefficient between the bolt 30 and the exhaust manifold 12 enables the exhaust manifold to slide freely during thermal expansion/contraction, thereby improving the fatigue life of the exhaust manifold 12 and bolt 30. The bolted joint 22 thus employs the thermal resistant, low friction coating 70 on washers 36 to effectively lower the coefficient of friction at the interface of the bolt head 32 and the exhaust manifold flange 38 to allow maximum expansion and contraction of the exhaust manifold 12 while preventing or greatly reducing bolt deformation (e.g., bending displacement of the bolt). Thus, the friction coefficient of low friction coating 70 is critical. In many cases, utilizing only a single washer 36 sufficiently reduces the frictional force between the bolt 30 and exhaust manifold 12 and allows sliding of the exhaust manifold 12 under the given thermo-mechanical load. However, utilizing two washers 36 will switch the sliding interface to washer-to-washer contact, thereby further reducing frictional force between the bolt 30 and exhaust manifold 12.

Described herein are systems and methods for improving the thermo-mechanical fatigue life of a bolt and associated components to be coupled and/or sealed together. The bolt is provided clearance in one of the components and includes a washer having a high temperature resistant, low friction coating to facilitate thermal expansion/contraction of the components without bending or shearing of the bolt. Additionally, a lock patch is included to facilitate preventing bolt loosening during the thermal expansion/contraction. In this way, the low friction washers increase the thermo-mechanical fatigue life of the bolts and the components.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A bolted joint for coupling two components that undergo thermal expansion and contraction, the bolted joint comprising:
   a bolt having a head and a stem, the bolt configured to provide a clamping force between the two components; and
   a first washer having a thermal resistant, low friction coating configured to be disposed between one of the two components and the bolt head to enable the one component to slide relative to the bolt during the thermal expansion and contraction, while maintaining the clamping force, to facilitate preventing bending or shearing of the bolt;
   further comprising a second washer disposed between the first washer and the bolt head, the second washer having the thermal resistant, low friction coating to enable the first and second washers to slide relative to each other during the thermal expansion and contraction, while maintaining the clamping force, to further facilitate preventing bending or shearing of the bolt.

2. The bolted joint of claim 1, wherein the thermal resistant, low friction coating includes a multi-layer coating comprising a first layer of material, a second layer of material, a third layer of material, and a fourth layer of material.

3. The bolted joint of claim 2, wherein the first layer of material is chromium, the second layer of material is chromium-nickel, the third layer of material is a primer, and the fourth layer of material is a-C:H:WC.

4. The bolted joint of claim 3, wherein the first and second washers are annular and each have a first side and an opposite second side, wherein the thermal resistant, low friction coating is disposed on each of the first and second sides of each of the first and second washers.

5. The bolted joint of claim 2, wherein the thermal resistant, low friction coating has a coefficient of friction of less than 0.6.

6. The bolted joint of claim 2, wherein the thermal resistant, low friction coating is resistant to temperatures up to approximately 600° C.

7. The bolted joint of claim 1, wherein the thermal resistant, low friction coating is a diamond-like carbon tungsten material.

8. The bolted joint of claim 1, further comprising a thread lock patch configured to secure the bolt stem to the other of the two components.

9. An assembly configured to undergo thermal expansion and contraction, the assembly comprising:
   a first component defining a first bore:
   a second component defining a second bore; and
   a bolted joint coupling the first and second components, the bolted joint comprising:
   a bolt having a head and a stem, the bolt extending into the first and second bores to provide a clamping force between the first and second components; and
   a first washer having a thermal resistant, low friction coating, the first washer disposed between the first component and the bolt head to enable the first component to slide relative to the bolt during the thermal expansion and contraction, while maintaining the clamping force, to facilitate preventing bending or shearing of the bolt;
   further comprising a second washer disposed between the first washer and the bolt head, the second washer having the thermal resistant, low friction coating to enable the first and second washers to slide relative to each other during the thermal expansion and contraction, while maintaining the clamping force, to further facilitate preventing bending or shearing of the bolt.

10. The assembly of claim 9, wherein the first bore is sized to provide a clearance between the bolt stem and the first component to allow for the thermal expansion and contraction of the first component without contacting the bolt stem.

11. The assembly of claim 9, wherein the second bore threadingly receives the bolt stem, and a thread lock patch is provided to secure the bolt stem to the second component.

12. The assembly of claim 9, wherein the first component is an exhaust manifold and the second component is a cylinder head, and wherein the bolted joint includes a first bolted joint at a first end of the exhaust manifold, and a second bolted joint at an opposite second end of the exhaust manifold, and bolts without washers having the thermal resistant, low friction coating are coupled to the exhaust manifold between the first and second ends of the exhaust manifold.

13. The assembly of claim 9, wherein the thermal resistant, low friction coating is a multi-layer coating.

14. The assembly of claim 9, wherein the thermal resistant, low friction coating has a coefficient of friction of less than 0.6 and is resistant to temperatures up to approximately 600° C.

15. The assembly of claim 9, wherein the thermal resistant, low friction coating is a diamond-like carbon tungsten material.

16. The assembly of claim 15, wherein the multi-layer coating comprises a first layer of material, a second layer of material, a third layer of material, and a fourth layer of material, and wherein the first layer of material is chromium, the second layer of material is chromium-nickel, the third layer of material is a primer, and the fourth layer of material is a-C:H:WC.

\* \* \* \* \*